United States Patent

Sweger

[15] 3,667,539
[45] June 6, 1972

[54] ON-OFF TIME PROPORTIONING SUMMER-WINTER THERMOSTAT AND CONTROL SYSTEM EMPLOYING SAME

[72] Inventor: Russell P. Sweger, Rockford, Ill.
[73] Assignee: Barber-Colman Company, Rockford, Ill.
[22] Filed: May 24, 1971
[21] Appl. No.: 146,117

[52] U.S. Cl..............................165/26, 337/335, 337/337, 337/371, 337/377
[51] Int. Cl..........................................F25b 29/00
[58] Field of Search..................337/85, 38, 86, 39, 89, 40, 337/94, 104, 95, 335, 96, 336, 100, 340, 370, 371, 377, 337; 219/508, 323; 165/26

[56] References Cited

UNITED STATES PATENTS

| 2,024,385 | 12/1935 | Persons | 165/26 |
| 3,166,120 | 1/1965 | Butterfield et al. | 165/26 |
| 3,326,275 | 6/1967 | Ray | 165/26 |

*Primary Examiner*—Bernard A. Gilheany
*Assistant Examiner*—F. E. Bell
*Attorney*—A. Richard Koch

[57] ABSTRACT

A heating-cooling thermostat employs alternative circuits during heating and cooling seasons to move an actuator in one direction. Heaters controlled by thermostatic contacts in each of the alternative circuits heat bimetals to open the contacts periodically to provide pulsed on-off current through the actuator. The on-off time ratio is modified by the deviation of the controlled temperature from a setpoint to provide on-off time proportioned current to the actuator.

12 Claims, 5 Drawing Figures

PATENTED JUN 6 1972 3,667,539

INVENTOR
RUSSELL P. SWEGER

BY A. Richard Koch
AGENT

INVENTOR
RUSSELL P. SWEGER
AGENT

ON-OFF TIME PROPORTIONING SUMMER-WINTER THERMOSTAT AND CONTROL SYSTEM EMPLOYING SAME

BACKGROUND OF THE INVENTION

This invention relates primarily to automatic temperature regulation, but may be adapted to control other conditions.

According to one well known system for temperature regulation a single pipe, duct or other conduit is employed to deliver heating and cooling fluid alternatively to the controlled space and the rate at which the fluid is delivered is controlled by a valve, damper, or the like to regulate the space temperature. Since the fluid delivery must be increased in response to demand for heat during the heating season and in response to demand for cooling during the cooling season, such a system presents problems for automatic controls. A double throw thermostat is commonly employed to effect reversal of the actuator. In order to prevent unwanted reversal of the actuator in response to temperature overshoot a summer-winter switch is provided to disable the unwanted thermostat contact. Such a switch may be operated manually or automatically in accordance with the temperature of the fluid. Usually such systems have been on-off controls with resultant overshoots and considerable variation in controlled temperature due to the inherent hysteresis of on-off controls. On-off thermostats generally must be reset when converting from summer to winter operation. Some proportioning systems have been used, but they have been expensive or have involved a cumbersome changeover from heating to cooling.

SUMMARY OF THE INVENTION

According to this invention an on-off time proportioning heating-cooling control system has been provided for use in a single conduit system as described above. The system provides close temperature control and substantially eliminates overshoot. Time proportioning is accomplished by periodically opening the thermostat contacts, the ratio of on-off times being a substantially linear function of the deviation of the controlled temperature from a reference. For manual changeover at the thermostat only two wires to the thermostat are required and for automatic or remote changeover only three wires are required. An on-off time proportioning reversible controller has been provided that is suitable for use in the described system. The controller is simple and inexpensive to manufacture. It requires no change in setting when converted from one mode of operation to the other.

DESCRIPTION OF THE PREFERRED EMBODIMENTS

Figure 1:
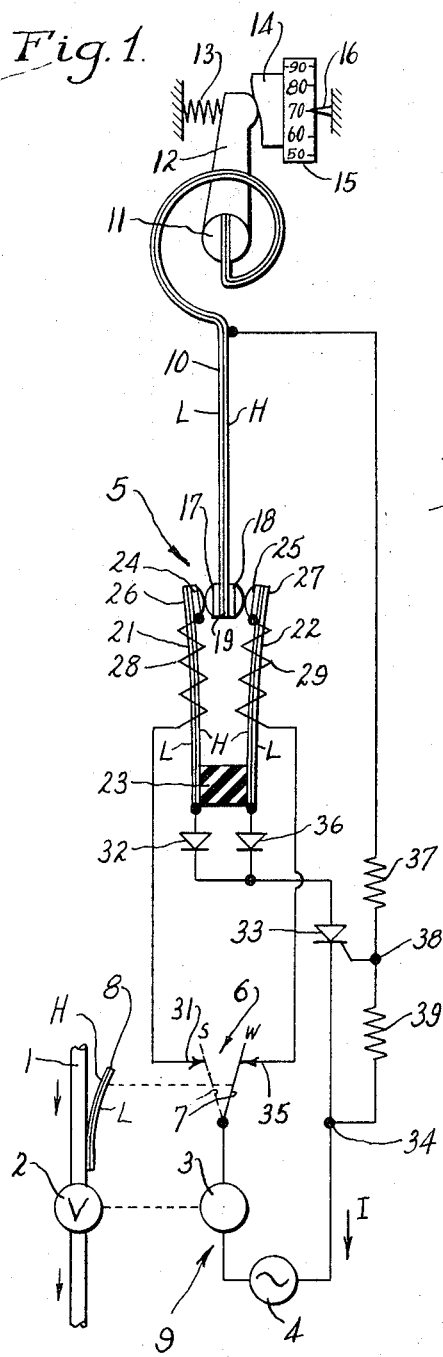
FIG. 1 is a schematic diagram of a preferred heating-cooling thermostat incorporated in a heating-cooling control system according to this invention.

As shown in FIG. 1, a pipe 1 delivers hot or chilled water alternatively according to whether it is the heating or cooling season to a radiator, or the like, (not shown) in a conditioned space. The rate of flow of water to the radiator is regulated by a valve 2 operated by an actuator 3. The actuator is energized from a power supply 4 through an on-off time proportioning current controller in the form of a heating-cooling thermostat 5 responding to temperature in the controlled space and a summer-winter changeover switch 6. The changeover switch could be manually or automatically operated and may or may not be incorporated in the thermostat 5. As shown, the blade 7 is moved automatically by a bimetal 8 mounted on pipe 1 upstream from valve 2. If the high expansion side H of bimetal 8 is toward the right, the blade 7 will be moved to winter position W at the right when hot water is in the pipe and to alternative summer position S at the left when chilled water is in the pipe. The actuator 3, power supply 4 and sometimes changeover switch 6 comprise a series circuit 9 external to the thermostat 5, which controls the current I through the circuit.

In the thermostat 5 a thermostatic bimetal sensor 10 is mounted in cantilever fashion on a shaft 11 rotatable about its axis by a follower 12, biased by spring 13 against a cam 14, movable to adjust the setpoint. The cam has a dial 15 cooperating with a pointer 16 to indicate the setpoint condition. Contacts 17, 18, movable by the free end 19 of bimetal 10, are in fixed spaced opposed relation and form a set of contacts movable in response to setpoint adjustment and variation in the sensed ambient temperature of the conditioned space. In this embodiment the contacts 17, 18 are mounted directly upon the free end 19, which acts as a movable support for them. With the high H and low L expansion sides of bimetal 10 as indicated, the contacts 17, 18 are moved to the right as the setpoint is raised and as the sensed temperature condition decreases, and to the left as the setpoint is lowered and as the sensed temperature condition increases. A pair of flexible heat sensitive bimetals 21, 22, having small mass, are cantilevered at one end from a fixed insulating support 23 in spaced relation and with their high expansion sides H facing each other. Contacts 24, 25, movable by and shown as mounted on the respective free ends 26, 27 of bimetals 21, 22, form a second set of contacts normally engaging the first set of contacts 17, 18 to provide two pairs of normally closed contacts 17, 24, and 18, 25. The contacts 24, 25 are insulated one from the other as by the insulating support 23 in this embodiment. Heating means is provided for the bimetals 21, 22 in the form of resistance heaters 28, 29 wound upon the respective bimetals to assure good heat transfer from the heaters to the bimetals. Upon bimetal 21 being heated by heater 28, it deflects to separate the pair of contacts 17, 24 and, upon bimetal 22 being heated by heater 29, bimetal 22 deflects to separate the pair of contacts 18, 25.

During the cooling season the external circuit 9 may be completed through a summer heater circuit in the thermostat 5 from contact 31 at the summer position S of changeover switch 6 through heater 28, bimetal 21, rectifying diode 32 from anode to cathode and switching means (shown as an SCR 33) between load (anode) and common (cathode) terminals to a connection 34. During the heating season the external circuit 9 may be completed through a winter heater circuit in thermostat 5 from contact 35 at the winter position W of changeover switch 6 through heater 29, bimetal 22, rectifying diode 36 and SCR 33 between anode and cathode to the connection 34. It will be noted that the power supply 4 in the external circuit 9 also is the current supply for the heater circuits. At least one of the heaters 28, 29 is energized whenever the SCR 33 is conducting. The SCR is gated into conduction by alternative control circuits in thermostat 5. During the cooling season a control circuit extends from contact 31 at the summer position S of changeover switch 6 through heater 28, contact pair 24, 17, bimetal 10, current limiting resistor 37, junction 38 and SCR 33 between control (gate) and common (cathode) terminals to connection 34. During the heating season a control circuit extends from contact 35 at the winter position W of changeover switch 6 through heater 29, contact pair 25, 18, bimetal 10, resistor 37, junction 38 and SCR 33 between gate and cathode to connection 34. Each of these control circuits is completed through the external circuit 9, in which the power supply 4 is the voltage source for the control circuits. A gate resistor 39 between junction 38 and connection 34 limits the gate-cathode voltage on the SCR. The diodes 32, 36, included in the heater circuits between bimetals 21, 22 and SCR 33, are needed to isolate the contacts 24, 25 from each other in the control circuits.

Figure 2:
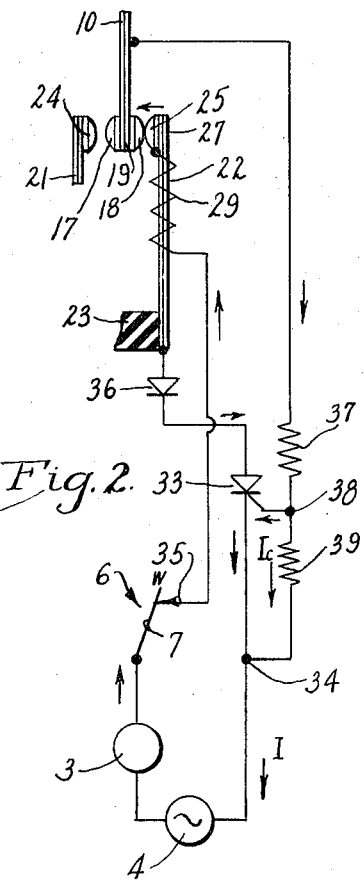
FIG. 2 is a circuit diagram of the effective circuits of the embodiment shown in FIG. 1 during the heating season.

Let us assume that the dial 15 has been rotated with respect to pointer 16 to provide a setpoint of approximately 70°, that the ambient temperature sensed by bimetal 10 is below the setpoint and that hot water is being delivered through pipe 1. Bimetal 8 will be deflected to the right by heat from the water in pipe 1 so that changeover switch 6 will be in winter position W with blade 7 engaging contact 35. The effective electrical circuits during the heating season are shown in FIG. 2. Control voltage from power supply 4 forces current through actuator 3, changeover switch 6, heater 29, contact pair 25, 18, bimetal 10, resistor 37, junction 38, gate-cathode in SCR 33 and the parallel resistor 39, and connection 34 back to the power supply. The current $I_c$ through resistor 39 produces a voltage drop between junction 38 and connection 34, which, applied across the gate-cathode in SCR 33, gates the SCR into conduction. The conducting SCR closes both heater and power circuits, since they are one and the same in this embodiment, permitting current I to flow from the current source and power supply 4 through actuator 3, changeover switch 6, heater 29, bimetal 22, diode 36, anode-cathode in SCR 33 and connection 34 back to power supply 4. The current I energizes actuator 3 to open valve 2, increasing the flow of hot water to the space, and passes through heater 29, generating heat deflecting bimetal 22 to separate contact pair 18, 25, thus breaking the control circuit and, by eliminating the gate-cathode voltage, rendering SCR 33 non-conducting. When SCR 33 no longer conducts, current I ceases, actuator 3 is deenergized to permit closing of valve 2, decreasing the flow of hot water to the space. Also when current I ceases, heat is no longer generated in heater 29, permitting bimetal 22 to move contact 25 back into engagement with contact 18 thus reestablishing the control circuit and beginning another cycle.

Since the heated bimetal 22 has small mass, it responds quickly to heating and cooling so the cycles are very short, the effect on actuator 3 of the pulsing constant amplitude current I being comparable to a continuous amplitude modulated current, resulting in a partial closure of the valve dependent upon the on-off time ratio of current I. With the sensed ambient temperature below the setpoint, the condition sensing bimetal 10 is deflected to the right, bending the heated bimetal 22 away from its normal position. Heat is required to overcome this deformation before the contact 25 can be separated from contact 18. Since heat is lost during both the heating and cooling portions of the cycle and because more heat is lost at higher temperature differences between the heated bimetal and the ambient air, the ratio of on-off times becomes larger as the ambient temperature falls and becomes smaller as the ambient temperature rises until, at and below a predetermined reference temperature, which is determined by the setpoint, the contacts 18, 25 are continuously separated. The on-off time ratio is a substantially linear function of the difference between the sensed and reference temperatures. The current is therefore on-off time proportioned.

Figure 3:
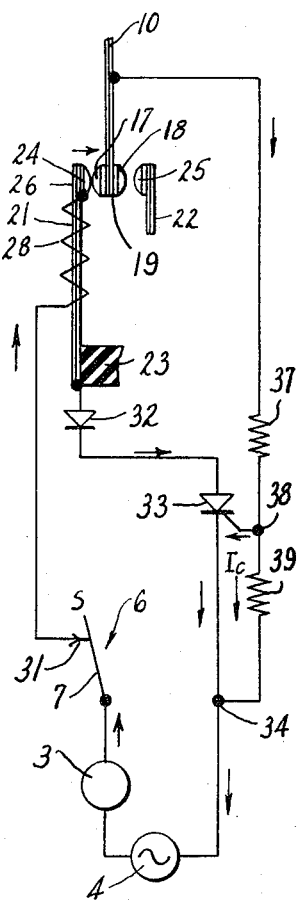
FIG. 3 is a circuit diagram of the effective circuits of the embodiment shown in FIG. 1 during the cooling season.

Now let us assume that the setpoint remains at 70°, that the ambient temperature is above setpoint and that chilled water is being delivered through pipe 1. Bimetal 8 will be deflected to the left, moving blade 7 to the summer position S engaging contact 31, as shown by the dashed line positions in FIG. 1. The effective electrical circuits during the cooling season are shown in FIG. 3. They operate in a similar manner to those shown in FIG. 2 for use during the heating season. The control circuit comprises power supply 4, actuator 3, changeover switch 6, heater 28, contact pair 24, 17, bimetal 10, resistor 37, junction 38, gate-cathode in SCR 33 and the parallel resistor 39, and connection 34. The combined heater and power circuits comprise power supply 4, actuator 3, changeover switch 6, heater 28, bimetal 21, diode 32, anode-cathode in SCR 33 and connection 34. Aside from the substituted components in the effective circuits, the only differences are that bimetal 21 deflects to the left when heated by heater 28 to separate contact 24 from contact 17 in the control circuit, and that the on-off ratio increases as the ambient temperature rises and decreases as the ambient temperature falls.

Figure 4:
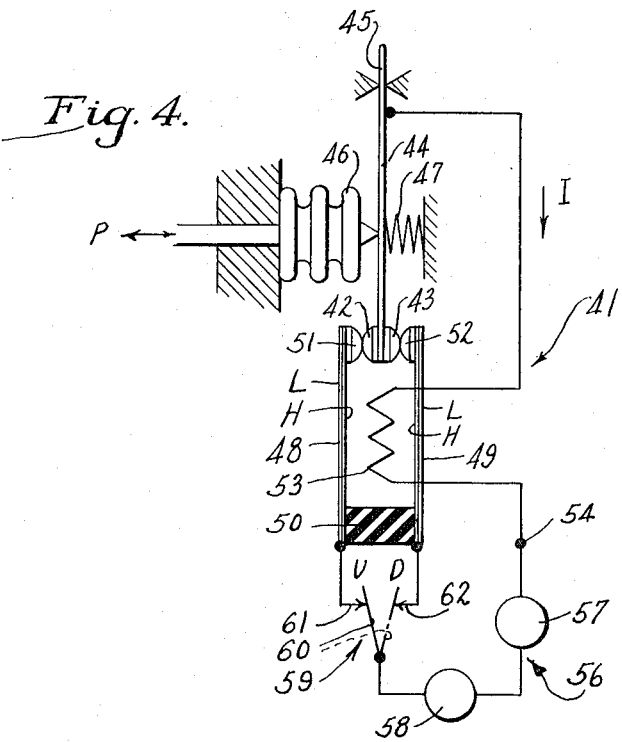
FIG. 4 is a schematic diagram of what is probably the most fundamental embodiment.

FIG. 4 illustrates the fundamentals of this invention. In the on-off time proportioning current controller 41 a set of contacts 42, 43 is mounted for movement by a support 44, shown as pivoted at end 45 and moved in compliance with a sensed condition, as by a bellows 46 in response to changes in pressure P in opposition to a bias provided by spring 47. A pair of flexible heat sensitive bimetals 48, 49 are cantilevered on a support 50. A second set of contacts 51, 52, insulated one from the other and movable by respective bimetals 48, 49, are normally in engagement with the first set 42, 43 to form two normally closed pairs of contacts 51, 42 and 43, 52. A heater 53 is coupled between a connection 54 and the first set of contacts 42, 43, shown for convenience as through support 44. The external circuit 56 comprises an actuator 57 and a power supply 58 coupled in series between connection 54 and either of the contacts 51, 52 of said second set, as shown for convenience by means of a selector switch 59 and the respective bimetals 48, 49. The selector switch may, if used, be considered as a component of either the controller 41 or the external circuit 56.

The controller 41, or the condition sensor (such as bellows 46) to which it responds, is adjusted so that, at the setpoint condition, both pairs of contacts 51, 42 and 52, 43 are closed when no heat is deforming bimetals 48, 49. Let us assume that the sensed pressure P is to be raised to, and maintained at, the setpoint condition, and that the actuator 57 controls a compressor producing the sensed pressure. The bellows 46 would be retracted, permitting the bias spring 47 to move contact 42 on support 44 to the left, stressing bimetal 48 by deformation. The selector switch 59 would be thrown to the up position U with blade 60 engaging contact 61, thus closing a combined heater and power circuit to pass current I from power supply 58 through blade 60, contact 61, bimetal 48, the closed contact pair 51, 42, support 44, heater 53, connection 54 and actuator 57 back to the power supply. The current I through heater 53 generates heat transmitted to both bimetals 48, 49. At first the heat transmitted to bimetal 48 relieves the stress therein and then deflects the bimetal further to separate contact 51 from contact 42, thus breaking the circuit. With no current flowing, no heat is generated and bimetal 48 moves the contact 51 back into engagement with contact 42 to reclose the circuit as the bimetal cools. After the first cycle there is only a slight movement required to open and close the contact pair 51, 42 and there is no stress to be relieved in bimetal 48, since it is maintained at a sufficiently high temperature to eliminate the stress. The further contact 42 is moved to the left in response to the sensed condition, the higher the temperature of bimetal 48 must be maintained to eliminate the stress. Since heat losses from the bimetal 48 increase as the difference between its temperature and ambient temperature increase, a longer heating time is required while the cooling time is reduced, resulting in a greater on-off ratio. In like manner the on-off ratio is reduced as setpoint is approached and passed. As a result of the small movement required to open and close the circuit, the cycle time is so short that the varying on-off time ratio has an effect on actuator 57 similar to that of an amplitude modulated continuous current. Although bimetal 49 is also deflected by heating and cooling, such deflection has no substantial effect on the operation of the controller while selector switch 59 is in the up position U.

If the pressure were to be reduced to, and maintained at, setpoint, the selector switch 59 would be thrown to the alternative down position D, moving blade 60 into engagement with contact 62, as shown in dashed lines. The circuit then comprises the power supply 58, blade 60, contact 62, bimetal 49, contact pair 52, 43, support 44, heater 53, connection 54 and actuator 57 in series. Operation of the controller 41 and the entire system would be similar to that described when the pressure was to be raised and will not be repeated.

Figure 5:
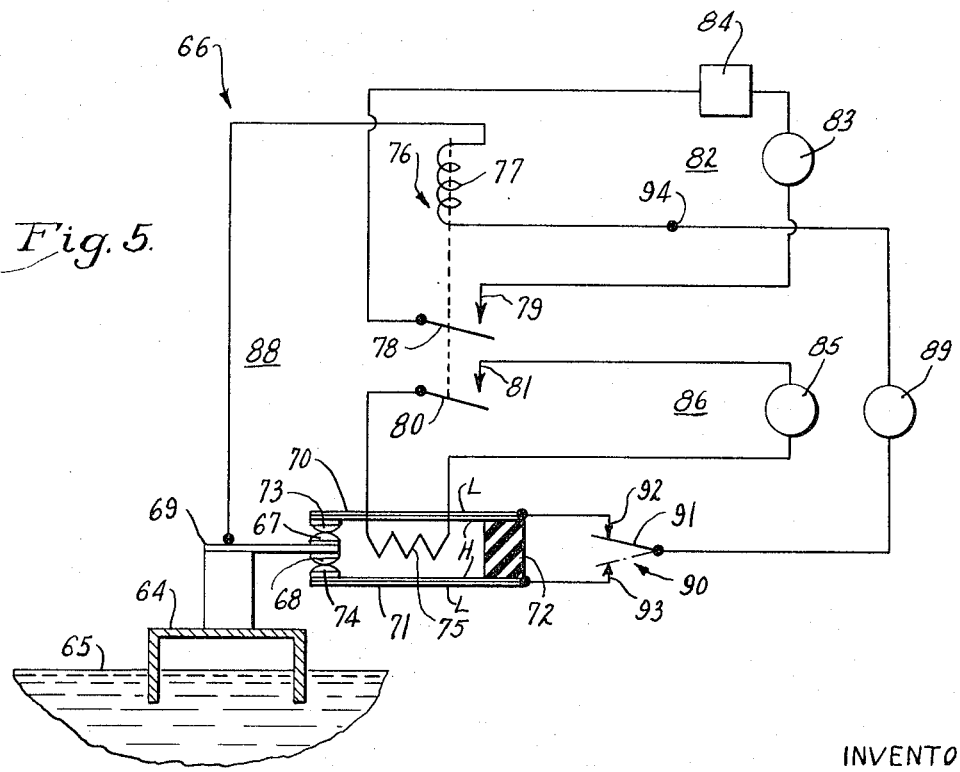
FIG. 5 is a schematic diagram of an embodiment with separate control, heater and power circuits.

As seen in FIG. 5, a float 64, rising and falling with the fluid level 65, comprises the condition sensor. The on-off time proportioning current controller 66 incorporates a set of contacts 67, 68 on a support 69, movable by the float 64. Bimetals 70, 71, mounted on support 72, have affixed thereon respective contacts 73, 74, insulated from each other, as a second set of contacts normally engaging the first set to form normally closed pairs of contacts 67, 73 and 68, 74. Heating means, shown as a single heater 75, is adapted to transmit heat to each of the bimetals 70, 71. A double pole relay 76 has a coil 77 and two pairs of normally open contacts 78, 79 and 80, 81. The contact pair 78, 79 is adapted to close a power circuit 82, external portions of which comprise a power supply 83 and actuator 84 in series. The contact pair 80, 81 in series with heater 75 is adapted for connection to an external current supply 85 to form a heater circuit 86. A control circuit 88 is energized from an external voltage source 89, coupled to alternative contact pairs 67, 73 and 68, 74 as by means of a selector switch 90 having a blade 91 alternatively engaging contacts 92, 93, and to a connection 94.

When blade 91 engages contact 92, the control circuit comprises voltage source 89, blade 91, contact 92, bimetal 70, the contact pair 73, 67, support 69, relay coil 77 and connection 94 so that the relay 76 is pulled in and the contact pairs 78, 79 and 80, 81 are both closed when coil 77 is energized by engagement of the contact pair 67, 73 and the relay 76 is dropped out and the contact pairs 78, 79 and 80, 81 are both opened when coil 77 is deenergized by separation of the contact pair 67, 73. When blade 91 engages contact 93, as shown in dashed lines, the control circuit comprises voltage source 89, blade 91, contact 93, bimetal 71, the contact pair 74, 68, support 69, relay coil 77 and connection 94. The operation is similar to that described above.

Since power circuit 82 is closed and opened by contact pair 78, 79 simultaneously with heater circuit 86 through contact pair 80, 81, it will be seen that the heater 75 and actuator 84 could be energized by a common power and current supply and be controlled by a single switching device, and that the heater and actuator could be connected in series, as in FIG. 4, or in parallel. FIG. 1 shows how the control circuit can also be energized by voltage from the same source as supplies current to the heater and power to the actuator. The single heaters in FIGS. 4 and 5 could be divided into halves positioned to transmit heat to respective heated bimetals, and connected either in series or in parallel. Any fast responding heat deformable elements could be substituted for the heated bimetals. Other controlled switching means could be substituted in embodiments using the alternative contact pairs to control such devices. Air or another temperature changing fluid could replace the hot or chilled water, a duct or other fluid conduit could replace the pipe 1, and a damper or other fluid flow regulator could replace the valve 2 in the FIG. 1 embodiment. The embodiments shown and described are merely representative and do not limit the scope of this invention which is defined only by the claims.

What is claimed is:

1. A reversible controller for on-off time proportioning current through an external circuit in response to a sensed variable condition and comprising first and second supports, one of said supports movable in response to the condition, first and second heat deformable elements having respective first and second free portions and portions affixed to said first support, a first set of contacts mounted in fixed spaced opposed relation on said second support, first and second contacts movable by the respective first and second free portions forming a second set of contacts and normally engaging said first set to form respective first and second normally closed pairs of contacts, and heating means adapted in response to completion of the external circuit through one of said pairs of contacts to generate heat deforming a respective one of the elements to separate the contacts of said one pair and break the circuit, whereby said current may be on-off time proportioned as a substantially linear function of a selected one of an increase and a decrease in deviation of the sensed condition from a reference.

2. A controller according to claim 1 wherein said heating means comprises first and second heaters in heat transfer relation to the first and second elements respectively.

3. A controller according to claim 1 wherein said heat deformable elements comprise bimetals.

4. A controller according to claim 1 wherein said one of the supports comprises a thermostatic bimetal.

5. A controller according to claim 1 additionally comprising means for connecting said pairs of contacts alternatively to the external circuit.

6. A controller according to claim 5 wherein said connecting means comprises a switch having first and second positions for coupling said respective first and second contacts to the external circuit.

7. A controller according to claim 1 additionally comprising switching means in series with said heating means and controllable by the connected one of the pairs of contacts.

8. A controller according to claim 7 wherein said switching means has load, control and common terminals, said control and common terminals connecting the switching means in series with the connected one of said pairs of contacts, and said load and common terminals connecting the switching means in series with said heating means.

9. A controller according to claim 7 wherein said heating means comprises first and second heaters in heat transfer relation to the respective first and second elements.

10. A heating-cooling control system comprising a conduit delivering to a conditioned space alternatively hot and cold temperature changing fluid, a fluid flow regulator in said conduit, an electric actuator energizable to operate said regulator, a power supply for energizing said actuator, a sensor subjected to ambient temperature in said space, a first set of contacts mounted in fixed spaced opposed relation and movable by the sensor, first and second thermal sensitive bimetals having respective first and second free ends and ends mounted in fixed spaced relation, first and second contacts movable by the respective first and second free ends forming a second set of contacts normally engaging said first set to form respective heating and cooling normally closed pairs of contacts, a control voltage source, means alternatively connecting said first and second contacts to the control voltage source as dictated by the temperature of the fluid being delivered, heating means in heat transfer relation to said bimetals, a current supply for energizing the heating means, and means responsive to engagement of said alternatively connected one of said pairs of contacts for closing a control circuit from the voltage source to energize a power circuit between said actuator and the power supply and to complete a heater circuit between said heating means and the current supply, whereby heat generated by the current through said heating means deflects one of the bimetals to separate said one pair of contacts to open the control circuit, deenergize said power circuit and break the heater circuit, thus providing a pulsing on-off energization of said actuator, said sensor deformable in response to temperature change in the space to modify the on-off ratio substantially in proportion to the deviation of the sensed temperature from a reference.

11. A heating-cooling control system according to claim 10 additionally comprising a switching means in series with said heating means and controllable by each of the alternatively connectable pairs of contacts.

12. A heating-cooling control system according to claim 10 wherein said heating means comprises first and second heaters in heat transfer relation to the respective first and second bimetals.

* * * * *

UNITED STATES PATENT OFFICE
CERTIFICATE OF CORRECTION

Patent No. 3,667,539   Dated June 6, 1972

Inventor(s) Russell P. Sweger

It is certified that error appears in the above-identified patent and that said Letters Patent are hereby corrected as shown below:

In column 2, line 3, change "right" to -- pipe --.

Signed and sealed this 24th day of October 1972.

(SEAL)
Attest:

EDWARD M. FLETCHER, JR.
Attesting Officer

ROBERT GOTTSCHALK
Commissioner of Patents